(12) United States Patent
Bani-Hashemi et al.

(10) Patent No.: US 7,671,342 B2
(45) Date of Patent: Mar. 2, 2010

(54) MULTI-LAYER DETECTOR AND METHOD FOR IMAGING

(75) Inventors: Ali Bani-Hashemi, Walnut Creek, CA (US); Farhad A. Ghelmansarai, Danville, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 229 days.

(21) Appl. No.: 11/034,348

(22) Filed: Jan. 11, 2005

(65) Prior Publication Data

US 2006/0151708 A1 Jul. 13, 2006

(51) Int. Cl.
*G01T 1/20* (2006.01)
(52) U.S. Cl. .............................. 250/370.11; 250/370.09; 250/394; 378/92; 378/98; 378/62; 378/11; 378/174; 430/57
(58) Field of Classification Search ............ 250/326.11, 250/370.09, 208.11, 370.11, 208.1, 582, 250/366, 393, 394, 559.21, 206; 378/92, 378/98, 62, 11, 174; 430/57
See application file for complete search history.

(56) References Cited

U.S. PATENT DOCUMENTS

| | | | |
|---|---|---|---|
| 4,855,598 A * | 8/1989 | Ohgoda et al. ............... | 250/582 |
| 5,079,426 A * | 1/1992 | Antonuk et al. ......... | 250/370.09 |
| 5,138,167 A * | 8/1992 | Barnes ................... | 250/370.01 |
| 5,245,538 A * | 9/1993 | Lis .............................. | 382/266 |
| 5,291,036 A * | 3/1994 | Tran et al. ...................... | 257/53 |
| 5,583,901 A * | 12/1996 | Reitter et al. .................... | 378/4 |
| 5,647,360 A | 7/1997 | Bani-Hashemi et al. | |
| 5,818,053 A * | 10/1998 | Tran ....................... | 250/370.09 |
| 5,825,032 A * | 10/1998 | Nonaka et al. ......... | 250/370.09 |
| 5,835,563 A | 11/1998 | Navab et al. | |
| 6,038,282 A | 3/2000 | Wiesent et al. | |
| 6,227,704 B1 | 5/2001 | Bani-Hashemi et al. | |
| 6,229,873 B1 | 5/2001 | Bani-Hashemi et al. | |
| 6,281,507 B1 | 8/2001 | Ghelmansarai | |
| 6,373,062 B1 | 4/2002 | Ghelmansarai | |
| 6,447,163 B1 | 9/2002 | Bani-Hashemi et al. | |
| 6,473,489 B2 | 10/2002 | Bani-Hashemi et al. | |
| 6,535,574 B1 | 3/2003 | Collins et al. | |
| 6,630,675 B2 | 10/2003 | Ghelmansarai | |
| 6,783,275 B2 | 8/2004 | Ghelmansarai | |
| 6,965,111 B2 * | 11/2005 | Endo ...................... | 250/370.11 |
| 7,122,804 B2 * | 10/2006 | Mollov .................. | 250/370.11 |
| 2001/0024484 A1 * | 9/2001 | Francke ....................... | 378/62 |
| 2002/0014591 A1 | 2/2002 | Ghelmansarai | |

(Continued)

OTHER PUBLICATIONS

Kaplan, Steven M., "Adaptive System", Wiley Electrical and Electronics Engineering Dictionary, 2004, pp. 13 and 860, John Wiley & Sons, Inc., Hoboken, New Jersey.

*Primary Examiner*—David P Porta
*Assistant Examiner*—Jessica L Eley

(57) ABSTRACT

X-ray portal imaging detectors have multiple layers, such as multiple layers of phosphor screens and/or detectors. Some x-rays that pass through one layer are detected or converted into light energies in a different layer. For example, one phosphor screen is provided in front and another behind that panel detector circuitry. Light generated in each of the phosphor screens is detected by the same detector circuitry. As another example, multiple layers of phosphor screens and associated detector circuits are provided. Some x-rays passing through one layer may be detected in a different layer. High energy x-rays associated with Megavoltage sources as well as lower or higher energy x-rays may be detected.

19 Claims, 2 Drawing Sheets

U.S. PATENT DOCUMENTS

| | | | |
|---|---|---|---|
| 2002/0109113 A1* | 8/2002 | Wang et al. | 250/584 |
| 2003/0083562 A1 | 5/2003 | Bani-Hashemi et al. | |
| 2003/0083564 A1 | 5/2003 | Ghelmansarai et al. | |
| 2003/0176779 A1 | 9/2003 | Ghelmansarai | |
| 2004/0024300 A1* | 2/2004 | Graf | 600/407 |
| 2004/0167388 A1 | 8/2004 | Ghelmansarai | |

* cited by examiner

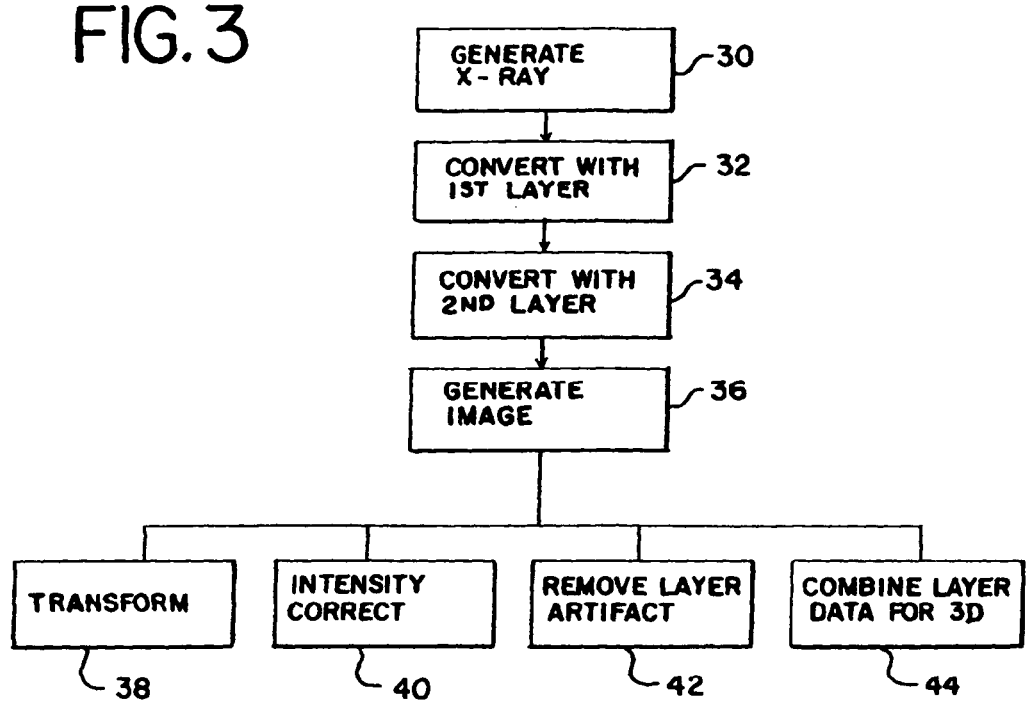
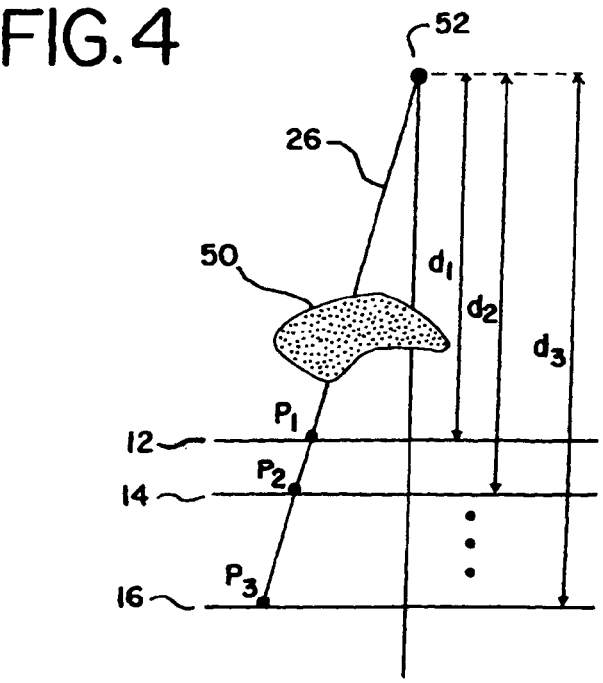

MULTI-LAYER DETECTOR AND METHOD FOR IMAGING

BACKGROUND

The present invention relates to x-ray imaging. In particular, x-rays for diagnosis or therapy are detected.

Image guided radiation therapy uses portal imaging. The treatment x-rays create a portal image. Typical therapeutic x-rays are high energy, such as generated by a 6-25 Megavoltage source. Such high energy x-rays are not optimum for imaging. The high energy photons have a high rate of penetration. The high rate of penetration reduces the number of photons detected. Due to the poor quantum efficiency, a low signal or contrast to noise ratio is provided.

Flat panel detectors are typically used in portal imaging. High energy x-ray photons interact with a phosphor screen to generate photons and energies visible to the detector, such as visible light. Flat panel detectors detect the converted energies. To increase detection efficiency, a build-up plate of copper or other material is usually placed between the source of the x-rays and the phosphor screen. The build-up plate converts some of the x-ray photons into secondary electrons. The secondary electrons interact with the phosphor screen to generate additional light. Even with a build-up plate, a high percentage (e.g. about 99%) of the high energy x-ray photons pass through the flat panel detector without being detected. A greater efficiency is provided by increasing the thickness of the phosphor screen. A thicker phosphor screen provides more opportunity for the high energy x-rays to interact with the phosphor screen to generate additional light photons. However, a thicker phosphor screen reduces the spatial frequency response. Interactions spaced further away from the detection circuitry in the phosphor screen are mere widely disbursed, reducing the modulation transfer function.

BRIEF SUMMARY

By way of introduction, the preferred embodiments described below include detectors and methods for imaging as a function of x-rays. The detectors have multiple layers, such as multiple layers of phosphor screens and/or detectors. Some x-rays that pass through one layer are detected or converted into light energies in a different layer. For example, one phosphor screen is provided in front and another behind flat panel detector circuitry. Light generated in each of the phosphor screens is detected by the same detector circuitry. As another example, multiple layers of phosphor screens and associated detector circuits are provided. Some x-rays passing through one layer may be detected in a different layer. High energy x-rays associated with Megavoltage sources as well as lower or higher energy x-rays may be detected.

In a first aspect, a detector is provided for imaging as a function of x-rays. A layer of photosensitive elements is provided between two phosphor screens.

In a second aspect, a detector is provided for imaging as a function of x-rays. Two different layers of semiconductor sensing devices are provided. The layers are positioned at different distances away from a surface for receiving x-ray radiation or from an x-ray source.

In a third aspect, a method is provided for portal imaging as a function of x-rays for therapy. x-rays are generated with megavoltage energy. The x-rays are converted with a first layer. The x-rays are converted with a second layer spaced from the first layer. An image is generated as a function of the conversions by the first and second layers.

The present invention is defined by the following claims, and nothing in this section should be taken as a limitation on those claims. Further aspects and advantages of the invention are discussed below in conjunction with the preferred embodiments and may be later claimed independently or in combination. Various embodiments of the present invention may have some, none or all of the advantages discussed herein.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 3 is a flow chart diagram of one embodiment of a method for detecting x-rays; and FIG. 4 is a graphical representation showing a spatial relationship of different detection layers.

DETAILED DESCRIPTION OF THE DRAWINGS AND PRESENTLY PREFERRED EMBODIMENTS

In one structure, a multidetector includes multiple vertically stacked layers of detector. X-rays that escape one detector layer may be detected by another layer. In another structure, a detector plane is sandwiched between two scintillator screens. Incident x-rays interact with the phosphor screens on both sides of the detector. The converted light from the upper screen is captured by the photodetector elements. The converted light from the lower screen moves through a translucent glass substrate of the detector to be captured by the photodetector elements, increasing the quantum efficiency of the detector. Either multilayer structure is used for image guided radiation therapy, intensity modulated radio therapy, diagnostic x-ray imaging, megavoltage imaging, flat panel imaging, dental x-ray imaging, charge coupled device imaging or in other environments.

Figure 1:
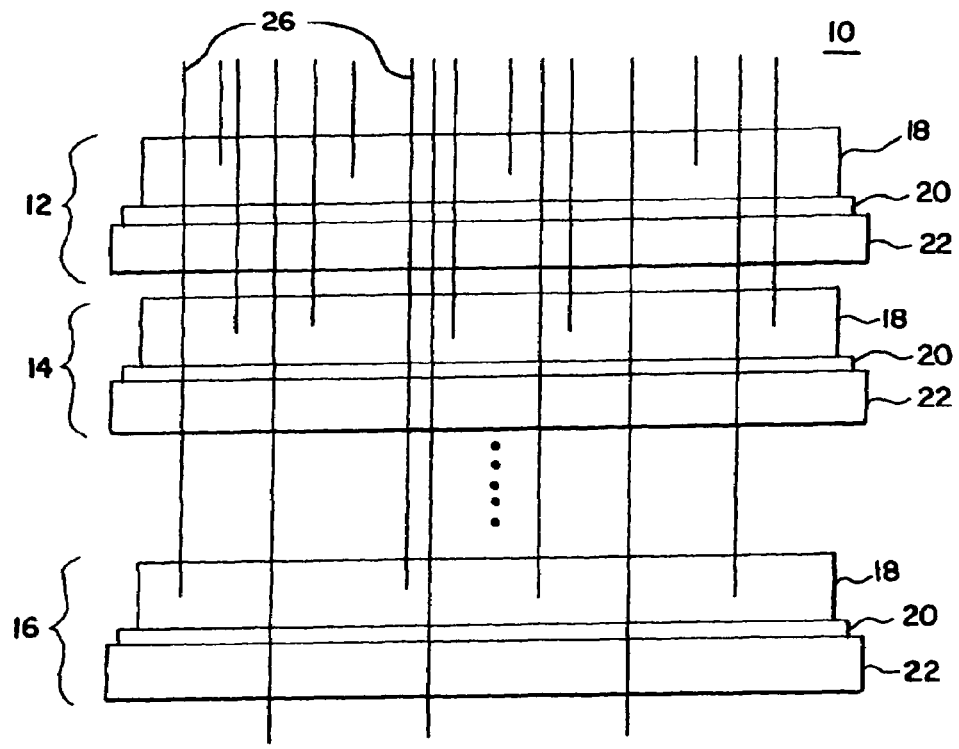
FIG. 1 is a cross-sectional diagram of one embodiment of a multilayer x-ray detector.
Figure 2:
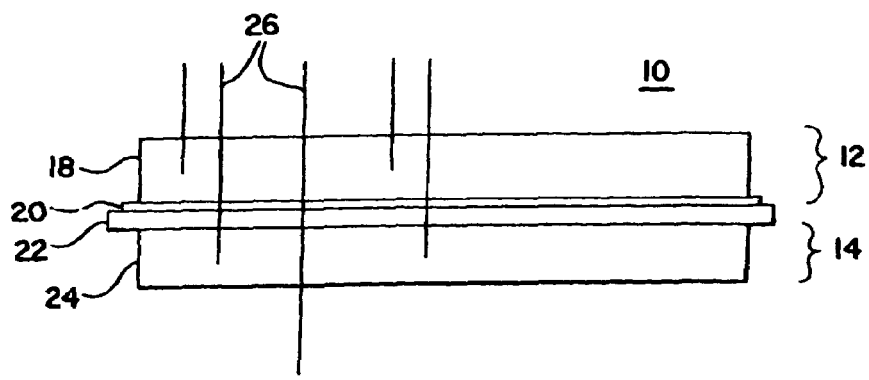
FIG. 2 is an alternative embodiment of multilayer x-ray detector.

FIGS. 1 and 2 show different embodiments of a detector 10 for imaging as a function of x-rays. The detector 10 is an electronic portal imaging device, or large area flat panel digital x-ray imaging detector. A two-dimensional active matrix of photodetectors or thin film transistors is read to acquire electrical imaging data. The detector 10 is used for image guided radiation therapy. For example, a radiation therapy system has a megavoltage source for generating high energy x-rays. In alternative embodiments, systems with lower or higher energy x-rays may use the detectors 10. For example, the detector is provided in a diagnostic x-ray imaging system, such as a dental or medical diagnostic x-ray system.

The detector 10 of FIGS. 1 and 2 includes a plurality of layers 12, 14 and 16. Two, three or more layers 12, 14, 16 may be provided. For example, the detector 10 includes only two layers 12, 14.

The layers 12, 14, 16 are flat or curved panels at different distances away from a surface of incident or received x-ray radiation. The difference in distances or parallel placement at different distances is along a given x-ray path 26 of travel away from a source. The layers 12, 14, 16 are positioned perpendicular to or at angles to a given path 26 of travel x-ray radiation 26.

Each layer 12, 14 includes a phosphor screen 18, 24. The phosphor screen 18, 24 is a scintillator layer of phosphor material, combinations of materials, or other now known or later developed materials for converting x-ray energy into energies at other frequencies for detection. The phosphor screen 18, 24 is a solid layer of material, a mesh or other configuration. The phosphor screen 18, 24 has a constant or variable thickness. In one embodiment, the thickness is about 0.5 to 1 mm, but greater or lesser thicknesses may be provided.

The phosphor screen 18, 24 of each layer 12, 14 is a same thickness or varies in thickness in the same way. Alternatively, the thickness of the phosphor screens 18, 24 is different for the different layers 12, 14. For example, a cesium iodide phosphor screen 18, 24 for one layer 12 has a 0.2 or 0.3 mm thickness, and another cesium iodide phosphor screen 18, 24 for a different layer 14 has a greater thickness, such as 1 mm or greater. Other differences between the phosphor screens 18, 24 of the different layers 12, 14 may be provided. Such as concentration of component materials, types of materials, distribution of materials or other structure.

At least one detector layer 20 of detecting devices is provided between layers of phosphor screens 18, 24 as shown in FIGS. 1 and 2. The detector layer 20 includes photosensitive elements, such as photodiodes, or other semiconductor sensing devices. In one embodiment, the detector layer 20 is amorphous silicon or a direct detector with integrated amorphous selenium. Photodiodes are formed for detecting light generated by the phosphor screen 18. In other alternative embodiments, the detector layers 20 include charge coupled devices, such as used in dental imaging. Other now known or later developed image sensing devices, such as cameras, may be provided. The detection layer 20 also includes switching elements, such as charge amplifiers, and/or other electronics for detecting accumulated charges or otherwise routing information for further processing. Some or all of the additional electronics may be spaced throughout the detection layer 20, on the edges of the detection layer 20 away from incident x-ray radiation, or spaced from the detection layer 20. The amount of electrical charge generated by the photodiodes or other x-ray detectors may be linearly related to the amount of radiation or the photon count received. Each scan or readout from a two-dimensional array of active matrix of the detector layer 20 provides a plurality of pixel samples representing a two-dimensional area.

The detection layer 20 is formed on a substrate 22 by deposition, etching, patterning, bonding, soldering or other techniques. The substrate 22 is glass, silicon, gallium arsenide, or other material. In one embodiment, the substrate 22 is clear or substantially transparent for one or more ranges of frequencies of the converted energies from the phosphor screen 24, such as being substantially transparent to energy at visible wavelengths. Alternatively, a substantially opaque, generally opaque or completely opaque substrate 22 is provided. The substrate 22, detection layer 20 and one or more phosphor screens 18, 24 form a flat or curved panel for the detection of incident x-rays 26. The panel has any desired dimensions. The panel is square, rectangular, triangular, hexagonal, circular or other shape.

FIG. 2 shows one embodiment of the detector 10 with a single detector layer 20 and multiple phosphor screens 18, 24. The substrate 22 is generally transparent to energies generated by the phosphor screens 18, 24. Photosensitive or other detection elements are doped or otherwise provided on one surface of the substrate 22 as the detection layer 20. One phosphor screen 18 is adjacent to the surface and the detection layer 20. The other phosphor screen 24 is adjacent an opposite surface of the glass substrate 22 than the first surface or the detection layer 20. X-rays that generate light energies or detection energies in the first phosphor screen 18 are detected by the detector layer 20. X-rays passing through the first phosphor screen 18 may interact with the second phosphor screen 24. The interaction generates light as a point source that radiates outwardly. Some of the light radiates through the glass substrate 22 to the detection layer 20 for detection. Both phosphor screens 18, 24 generate detectable energies. The overall thickness of the two phosphor screens 18, 24 for detection or conversion of energies is increased while minimizing loss of spatial frequency response.

FIG. 1 shows another embodiment of the detector 10. Each layer 12, 14, 16 includes a phosphor screen 18, a detector layer 20 and a substrate 22. Additional components may be provided for each layer 12, 14, 16, such as an additional phosphor screen 24. The layers 12, 14, 16 are spaced apart from each other or may be stacked in contact with each other. One or more phosphor screens 18 separates each detection layer 20. The different detector layers 20 of semiconductor sensing devices are positioned at different distances away from the surface first receiving the x-rays or different distances away from the source along any given path 26 of travel of the x-ray radiation. Each detector layer 20 detects energies generated by an adjacent phosphor screen 18. A layer of opaque material may be provided between each of the layers 12, 14, 16. Alternatively, light from phosphor screens 18 of adjacent layers 12, 14, 16 impinges upon a given detector layer 20.

The type of detector layer 20, density of sensing or photosensitive elements, thicknesses of phosphor screen 18, substrate characteristics 22 and/or other characteristics of a layer 12, 14, 16 is different for one layer 12 than a different layer 14. Alternatively, the characteristics are the same.

In the embodiment shown in FIG. 1 or 2, one or more build-up plates may be positioned adjacent to phosphor screen 18. For example, a 1 mm or other thickness layer of copper is positioned adjacent to the phosphor screen 18. The build-up plate isolates each of the phosphor screens 18 from the detector layers 20 of the different layers 12, 14, 16. In alternative embodiments, one or more of the phosphor screens 18 are free of a build-up plate.

FIG. 3 shows one embodiment of a method for portal imaging as a function of x-rays used for therapy. The method is implemented using either of the detectors 10 of FIG. 1 or 2, or other detectors. Additional, different or fewer acts than shown in FIG. 3 may be provided, such as providing the method without one or more of acts 38, 40, 42 and 44. In another example, the method is implemented without act 30, such as by detecting natural sources of x-ray radiation. Other imaging processes, such as an offset correction to account for dark current or bias currents, gain correction as a function of location may be provided.

In act 30, x-rays are generated. For example, a megavoltage x-ray source generates high energy x-rays for therapeutic application, such as for the destruction or reduction of tumors or cancers. These x-rays are generated for image guided radiation therapy. In one embodiment, a cone beam of x-rays is generated with or without additional collimation. The x-rays are generated for two-dimensional imaging, such as where the x-ray source is maintained in a given position. Alternatively, the x-ray source and/or detectors are on a gantry and repositioned relative to a patient for performing three-dimensional scanning. A plurality of two-dimensional scans at different angles allows three-dimensional reconstruction. A relative angle for each of the cone beam based scans is used for the three-dimensional reconstruction.

In acts 32 and 34, the x-rays are converted to other energies with different layers. For example, phosphor screens convert the x-rays to light or visible wavelengths. Conversions to other energies, such as infrared, ultraviolet or greater or lesser wavelengths may be provided. The different layers used for performing the conversions are different phosphor screens separated by at least one detection layer, other structure or a gas. For example, a single detection layer separates two different phosphor screens. As another example, one or more phosphor screens are provided for each of a plurality of detector layers. In one embodiment, the layers are positioned in parallel adjacent to each other with or without spacing or other separation. Alternatively, the two layers are offset from each other along a perpendicular, and/or parallel dimension relative to a path 26 of travel of a given x-ray beam or photon.

In act 36, an image is generated as a function of the conversion by the multiple layers. Converted energy is detected by one or more detection layers. Data is generated by the detection layer in response to the converted energy. Data may be generated from one detector layer in response to light from multiple phosphor layers. Multiple detection layers may generate data in response to light from respective layers for converting the energies.

Images formed from data for different detector layers are substantially identical except for scale, intensity differences and artifacts introduced by differences in the path of travel. To increase the quantum efficiency, the data from the plurality of detector layers may be combined, Averaging, weighted averaging, filtering or other combination processes may be used. Let f be the x-ray intensity of a ray entering a detector plane. The first detector will have the intensity of $i_1 = f \cdot q_1$. The x-ray intensity that leaves a first detector and reaches a second detector is $f(1-q_1)$. This process continues. The nth detector receives $f(1-q_1)(1-q_2)\ldots(1-q_{n-1})$ of the x-ray intensity, and generates intensity $i_n = f(1-q_1)(1-q_2)\ldots(1-q_{n-1})\cdot q_n$.

To increase the quantum efficiency of the entire system, the intensity of each image is summed. The summed image has the intensity of:

$$i_{sum} = f q_1 + f(1-q_1)\cdot q_2 + \ldots f((1-q_1)(1-q_2)\ldots(1-q_{n-1}))\cdot q_n$$

In this case, the quantum efficiency of the total system is:

$$q_{sum} = q_1 + (1-q_1)\cdot q_2 + \ldots ((1-q_1)(1-q_2)\ldots(1-q_{n-1}))\cdot q_n$$

Where each of the detector layers is associated with a different characteristic, such as one detector layer having increased contrast-to-noise ratio as compared to another detector layer increased spatial resolution, the combined data may provide more optimum information. Adaptive combination processes may be used to further optimize the information, such as weighting data associated with the higher spatial resolution more heavily where noise is minimal or a contrast-to-noise ratio is above a threshold amount and weighting the higher contrast-to-noise information greater in other circumstances. The weighting may be adjusted as a function of location within the two-dimensional image plane. With or without adaptive weighting, the combined data from different detection layers may provide higher signal-to-noise ratio.

To avoid errors associated with differences in scale, data from one or more layers or detectors is transformed in act 38. The data from the different layers is transformed to have a common geometric scale, such as transforming data from one or more layers to the scale of another layer or transforming data from all the layers to a common scale. FIG. 4 shows the relationship of the layers 12, 14, 16 relative to a source 52 for one path 26 of travel of x-rays through an object 50. As an example for the transformation, the data from each of the lower layers 14, 16 are transformed to the scale of the uppermost layer 12. After scaling, the data is combined. The scaling and combination are mathematically represented by:

$$I_{sum} = \sum_{i=1}^{n} k_i \cdot s_i(I_i),$$

where $s_i(I_i)$ is a function that scales/resizes image $I_i$ by the factor $$\frac{d_i}{d_1} \cdot k_i = \left(\frac{d_i}{d_1}\right)^2$$

where $k_i$, is the correction factor for image intensities, $I_{sum}$ is the summed image data for a given location, $d_1$ is a distance from the x-ray source 52 to the first detector layer 12, and $d_i$ is the distance from the x-ray source 52 to another layer 14, 16. For a given point p on layer 12, 14, 26, the transformation is a function of the angle of the path 26 of travel of the x-ray from the x-ray source 52 through the layers 12, 14, 16 as shown in FIG. 4. In alternative embodiments, a different transformation or no transformation is provided, such as where the layers are sufficiently close and the x-ray source 52 sufficiently far away that any differences in scaling are minimal or reduced.

In act 40, the intensities of data from one layer are corrected relative to data from another layer. The correction is performed as a function of the distances between the layers. For example, the distance of each of the layers from a source of x-rays is used to determine the correction factor $k_i$ shown above. The intensity values are corrected for the perspective effect since the light intensities are reduced by the square of the distance from the source. In alternative embodiments, intensity correction is not performed.

In act 42, artifacts caused by other layers or the layer detection structure are removed. An image projected on a detector layer 14, 16 spaced away from the source of x-rays 52 by another layer 12 includes artifacts from the previous detector layers. As x-ray energies pass through the previous detection layers, the detection layers generate an image effect. The effect of the previous layers on x-rays is minimized or removed by a blank image. The x-ray source 52 generates x-rays without an intervening object 50. The x-ray image detected at each of the detection layers 14, 16 is a blank image. The blank image is then subtracted from any received data when imaging an object 50. The subtraction eliminates or reduces the artifacts. For megavoltage imaging or other imaging, the artifact may be small due to the minimal interference by each detector layer. Electronics interspaced throughout the layer may increase the amount of interference. Where the artifact is sufficiently small or where the imaging requirements allow for an increased artifact, act 42 may be avoided.

In act 44, data from different layers is combined for three-dimensional imaging. For example, cone beam or megavolt cone beam imaging is used where a source is rotated in an arch from different angles relative to a patient. Data at each of the detectors is used for three-dimensional image reconstruction. For example, data for one layer of detectors is used to form a three-dimensional reconstruction representing a volume. Data from another detector layer is used to form a separate three-dimensional reconstruction representing the same volume. The data sets are then combined. Prior to the combination, the data sets are transformed for differences in geometric scale, intensity or artifacts. By reconstructing a plurality of volumes from each of the detector layers separately, adaptive combination is provided for the reconstruction data. For example, a weighted combination is used where the weight is a function of a gradient of one of the sets of data. Where the different detector layers are associated with different phosphor screen thicknesses, the data representing the volume from one layer may be associated with an increased spatial resolution. Local gradients throughout the volume are computed from the higher or highest spatial resolution data. If the local gradient is high, then the higher spatial resolution data is weighted to contribute more in the combination. If the local gradient is low, then the data from a greater signal or contrast-to-noise ratio data set is weighted higher in the combination. Where strong edges are provided, high spatial resolution is used. In alternative embodiments, adaptive combination is provided for each of the two-dimensional cone beam images and the resulted combined data is then reconstructed to a three-dimensional grid for three-dimensional imaging. In alternative embodiments, two-dimensional imaging is provided.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A detector for imaging as a function of x-rays, the detector comprising:
   first and second conversion layers to convert the x-rays into respective first and second energies;
   a first layer of semiconductor sensing devices positioned adjacent to the first conversion layer; and
   a second layer of semiconductor sensing devices positioned adjacent to the second conversion layer, the first and second layers of semiconductor sensing devices positioned at different distances away from a surface for receiving the x-ray radiation to detect respective first and second energies to be combined to form a single image as a function of their respective conversions, wherein a contrast-to-noise ratio characteristic of at least one of the first and second layers of semiconductor sensing devices is adaptively weighted before the first and second energies are combined to form the single image.

2. The detector of claim 1 wherein the first and second layers of semiconductor sensing devices comprise charge coupled devices.

3. The detector of claim 1 wherein the semiconductor sensing devices comprise photosensitive elements.

4. The detector of claim 1 wherein the first and second layers of semiconductor sensing devices each comprise a glass substrate with the semiconductor sensing devices on a first surface of the glass substrate.

5. The detector of claim 1 in a mega voltage radiation therapy system.

6. The detector of claim 1 wherein the first and second conversion layers each comprise a phosphor screen.

7. The detector of claim 6 further comprising a build-up plate adjacent each phosphor screen.

8. The detector of claim 6 wherein the phosphor screen of the first layer has a different thickness than the phosphor screen of the second layer.

9. The detector of claim 1 wherein a spatial resolution characteristic of the first layer of semiconductor sensing devices is different from that of the second layer of semiconductor devices.

10. The detector of claim 1 wherein the second layer of semiconductor sensing devices is located adjacent a surface of the second conversion layer opposite to that adjacent to the first layer of semiconductor sensing devices.

11. The detector of claim 1 wherein a source of the x-rays is movable to a plurality of positions having a plurality of angles with respect to an imaged object, wherein after imaging from at least some of the plurality of positions a plurality of the first energies are combined to form a first data set and a plurality of second energies are combined to form a second data set, wherein the first and second data sets are combined to form a three-dimensional image corrected for contrast-to-noise ratio characteristics.

12. A method for portal imaging as a function of x-rays for therapy, the method comprising:
   (a) generating the x-rays with megavoltage energy;
   (b) converting the x-rays with a first layer;
   (c) converting the x-rays with a second layer spaced from the first layer, wherein the first and second layers comprise phosphor screens separated by a detector layer;
   (d) generating an image as a function of the conversions of the first and second layers comprising generating, with the detector layer, first data from conversion by the first layer and second data from conversion by the second layer in response to light from both the first and second layers, wherein the first and second data comprise intensities; and
   (e) correcting the intensities of the first data relative to the second data as a function of distances of respective first and second layers from a source of the x-rays by adaptively weighting at least one of the first and second intensities as a function of location within the image.

13. The method of claim 12 wherein the first layer comprises a first detector layer, wherein the second layer comprises a second detector layer, and wherein (d) comprises generating the image as a function of first data from the first detector layer and second data from the second detector layer.

14. The method of claim 13 further comprising:
   (f) transforming the first and second data to a common geometric scale as a function of positions of the first and second layers relative to a source of the x-rays.

15. The method of claim 13 wherein (d) comprises subtracting a blank image from the second data, the blank image corresponding to data detected with the second detector layer without an object between a source of the x-rays and the first detector layer.

16. The method of claim 13 wherein (a) comprises generating a cone-beam, and wherein (d) comprises combining the first data representing a volume with the second data representing the volume, the combination being weighted as a function of a gradient of the first data.

17. The method of claim 12 wherein (a) and (d) comprise image guided radiation therapy.

18. The method of claim 12 wherein the at least one of the first and second intensities is weighted with a correction factor based on the distances between respective first and second layers and the x-ray source, the method further comprising:
   (f) summing the first and second data to form a single image.

19. The method of claim 12 further comprising:

(f) moving the x-ray source between a plurality of positions having a plurality of angles with respect to an imaged object;

(g) generating a plurality of first data from conversion by the first layer and a plurality of second data from conversion by the second layer in response to imaging from at least some of the plurality of positions;

(h) combining a plurality of first data from conversion by the first layer to form a first data set and a plurality of second data from conversion by the second layer to form a second data set; and (i) combining the first and second data sets to form a three-dimensional image corrected for distance effects on intensity.

\* \* \* \* \*